United States Patent
Yoshimura et al.

(10) Patent No.: US 6,706,101 B1
(45) Date of Patent: Mar. 16, 2004

(54) DOUBLE-COLOR INK AND WRITING UTENSIL CONTAINING THE SAME

(75) Inventors: Yasuyuki Yoshimura, Osaka (JP); Yasunori Nakatani, Osaka (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/720,901

(22) PCT Filed: Jul. 1, 1999

(86) PCT No.: PCT/JP99/03560

§ 371 (c)(1), (2), (4) Date: Feb. 12, 2001

(87) PCT Pub. No.: WO00/01778

PCT Pub. Date: Jan. 13, 2000

(30) Foreign Application Priority Data

| Jul. 3, 1998 | (JP) | 10-189399 |
| Jul. 3, 1998 | (JP) | 10-189400 |
| Aug. 19, 1998 | (JP) | 10-233312 |

(51) Int. Cl.[7] .............................. C09D 11/00
(52) U.S. Cl. ............... 106/31.28; 106/31.58
(58) Field of Search ............ 106/31.28, 31.58; 523/161

(56) References Cited

U.S. PATENT DOCUMENTS

| 4,490,177 A | * | 12/1984 | Shioi et al. | 106/1.05 |
| 4,545,819 A | * | 10/1985 | Shioi et al. | 106/1.05 |
| 4,604,139 A | * | 8/1986 | Shioi et al. | 106/1.05 |
| 4,657,591 A | * | 4/1987 | Shioi et al. | 106/31.57 |
| 5,474,603 A | | 12/1995 | Miyashita et al. | |
| 6,083,311 A | * | 7/2000 | Kanbayashi et al. | 106/31.65 |
| 6,120,590 A | * | 9/2000 | Miyamoto et al. | 106/31.6 |
| 6,275,816 B1 | * | 8/2001 | Hattori et al. | 106/14.11 |
| 6,422,776 B1 | * | 7/2002 | Nakatani | 401/209 |

FOREIGN PATENT DOCUMENTS

JP 61 123685 6/1986

* cited by examiner

Primary Examiner—Mark L. Bell
Assistant Examiner—Veronica F. Faison
(74) Attorney, Agent, or Firm—Howard C. Miskin, Esq.; Gloria Tsui-Yip, Esq.

(57) ABSTRACT

The object of the present invention is to provide a double-color ink which is capable of producing a double-color effect stably for a long period of time. The present invention relates to a double-color ink comprising (1) metal powder pigments, (2) water, (3) at least one water-soluble organic solvent selected from the group consisting of alcohols, glycols and glycol ethers having a branched hydrophobic group(s) and (4) at least one water-soluble dye selected from the group consisting of anthraquinone dyes, carbonium dyes and metal complex dyes; and a writing utensil using the same as an ink.

31 Claims, 2 Drawing Sheets

Sectional view and plan view of a double-color writing (Production of outlines utilizing "permeation and dispersion of water-soluble organic solvents")

Fig. 1: Sectional view and plan view of a double-color writing (Production of outlines utilizing "permeation and dispersion of water-soluble organic solvents")

Housing diameter: 0.840     Projection size of ball: 230

DOUBLE-COLOR INK AND WRITING UTENSIL CONTAINING THE SAME

TECHNICAL FIELD

The present invention relates to a double-color ink and a writing utensil using the same.

BACKGROUND ART

Double-color inks, when used in writing, are capable of producing a double-color writing (the contour line as shown in FIG. 1(A)) by making an outline around the writing, and used for markers and fiber-tipped pens.

As such double-color inks are known, for example, those which consist of metal powder pigments, water-soluble dyes, water and permeable organic solvents; are used in writing and drawing onto permeable writing surfaces as of paper, fabrics, etc.; produce a contouring effect as the water-soluble dyes permeate and disperse around the writing formed by the metal powder pigments, as shown in FIG. 1(B) (Japanese Unexamined Patent Publications No. 231777/1985, No. 123684/1986).

Thus, the conventional double-color inks utilize a double-color development mechanism shown in FIGS. 1(A) and (B). It is common that two types of the coloring components are used in the double-color inks: the colorant which permeates paper and the like and the colorant which do not permeate, namely a water-soluble dye and a metal powder pigment, respectively.

BRIEF DESCRIPTION OF DRAWINGS

FIG. 1(A) is a sectional view, and FIG. 1(B) is a plan view of the double-color writing.

DISCLOSURE OF INVENTION

Figure 1:
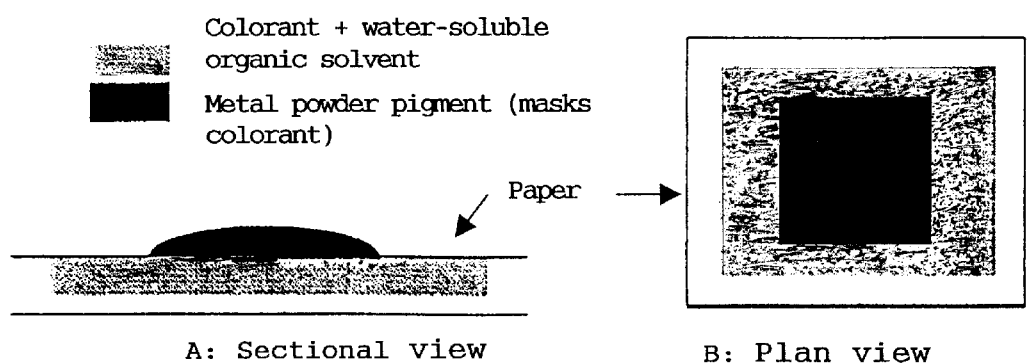
FIG. 1 schematically shows a double-color writing.

The double-color inks containing water-soluble dyes and metal powder pigments remain to be improved in long-term stability. More specifically, after the preparation of the double-color inks, the metal powder pigments may be ionized with the lapse of time during storage. In this ionization process, the water-soluble dyes may undergo reduction. The reduced water-soluble dyes may possibly lose its coloring ability completely, or may be discolored to lose their original colors (before storage). Therefore, the double-color effect may not be exerted.

The present invention has been accomplished based on the foregoing, and an object of the present invention is to provide a double-color ink having a stable double-color effect for a long period of time.

In view of solving the above problems, the inventors of the present invention conducted extensive research and found that an ink having a specific composition can achieve the above-mentioned object. The present invention is accomplished based on the finding.

The present invention relates to a double-color ink and a writing utensil using the same as described in the below.

Item 1. A double-color ink containing (1) a metal powder pigment, (2) water, (3) at least one water-soluble organic solvent selected from alcohols, glycols and glycol ethers having a branched hydrophobic group(s) and (4) at least one water-soluble dye selected from anthraquinone dyes, carbonium dyes and metal complex dyes.

Item 2. A writing utensil using the ink of item 1.

Item 3. A method of color development comprising the step of rubbing with an eraser at least part of the writing made with the ink of claim 1 on an absorbent surface to remove metal powder pigments therefrom.

1. Double-color Ink (Composition)

The double-color ink of the present invention contains (1) a metal powder pigment, (2) water, (3) at least one water-soluble organic solvent selected form alcohols, glycols and glycol ethers having a branched hydrophobic group(s), and (4) at least one water-soluble dye selected from anthraquinone dyes, carbonium dyes, and metal complex dyes.

Metal Powder Pigment

The metal powder pigment is not limited insofar as it has a metallic luster. For example, aluminum pigments, brass pigments, etc., are useful. Examples of the aluminum pigments include "Alpaste WJP-U75C", "Alpaste WE1200", "Alpaste WXM7675", "Alpaste WXM0630" (products of Toyo Aluminum Co., Ltd.), "1110W", "2172SW" (products of Showa Aluminum Corporation), "AW-808C" and "AW7000R" (products of Asahi Chemical Industry, Co., Ltd.). Examples of the brass pigments include "BS-605", "BS-607" (products of Toyo Aluminum Co., Ltd.), "Bronze Powder P-555" and "Bronze Powder P-777" (products of Nakajima Metallic Powder Co., Ltd.). Colored aluminum pigments such as "F500RG-W", "F500BG-W", "F701GR-W" and "F701RE-W" (products of Showa Aluminium Corporation) are also useful. These pigments are usable singly or in combinations of two or more types. The particle diameter of the metal powder pigment may be suitably selected depending on the type of the pigment.

Among these metal powder pigments, preferred are those which have been subjected to a waterproof treatment. The waterproof treatment can be conducted in conventionally known manners. For instance, usable are pigments treated with a phosphoric acid-containing solution and commercially available products, such as "Alpaste WXM0630" (product of Toyo Aluminium Co., Ltd.).

More specifically, preferably used is aluminum flake pigment composition (Japanese Unexamined Patent Publication No. 54475/1988) for aqueous coating compositions, the composition containing:

aluminum flakes;

an inorganic phosphoric acid (any one or more of ortho-phosphoric acid, pyrophosphoric acid, triphosphate, tetraphosphate and phosphite) at a concentration of 500–10000 ppm calculated as phosphorus derived from the inorganic phosphoric acid, based on the weight of aluminum;

an aliphatic compound (preferably $C_8$–$C_{50}$) (e.g., any one or more of 2-ethylhexylamine, caprylamine, decylamine, laurylamine, myristylamine, palmitylamine, stearylamine, oleylamine and like aliphatic amines, lauryl alcohol, stearyl alcohol and like aliphatic alcohols, amide oleate, amide stearate and like aliphatic amides, methyl oleate, butyl stearate and like aliphatic esters; sodium laureate, calcium oleate and like fatty acid metallic salts; dilauric acid phosphate and like orthophosphoric acid esters) in an amount of 0.3–5, parts by weight based on 100 parts by weight of aluminum, the aliphatic compound containing at least one functional group in its molecule;

0.05–10 parts by weight of water;

5–100 parts by weight of hydratable alcohol (any one or more of ethanol, isopropanol, isobutanol, isoamyl alcohol, ethyl cellosolve, butyl cellosolve, polyoxyethylene glycol, polyoxypropylene glycol, etc.); and 1–70 parts by weight of hydrocarbon oil (any one or more of mineral spirits, solvent naphtha, etc.).

The amount of a metal powder pigment can be suitably selected depending on the type of the pigment, and usually used at a concentration of about 4–15% by weight (as a metal powder), particularly 5–10% by weight (as a metal powder) based on the ink of the present invention. When the concentration of the metal powder pigment is higher than 15% by weight, an increased solid content may adversely affect the viscosity and fluidity of the composition. On the other hand, when the concentration of the metal powder pigment is lower than 4% by weight, the double-color effect may not be produced since the masking property of the pigment is decreased to an insufficient level. Therefore, the metal powder pigment may be used at a concentration of about 4–15% by weight based on the ink in the present invention.

Water-soluble Organic Solvent

As the water-soluble organic solvent is used at least one of alcohols, glycols and glycol ethers having a branched hydrophobic group(s).

In the water-soluble organic solvent of the present invention, "having a branched hydrophobic group(s)" means the structure having a hydrophobic group(s) as a side chain(s) attached to a main chain in a chain-like compound. The type of the hydrophobic group may be a methyl group, an ethyl group, etc. One molecule of the compound may have one or more hydrophobic groups. When two or more of the hydrophobic groups are present, they may be the same type or different types from each other. In case of hexylene glycol represented by the below formula, for example, the structure having a methyl group in a dotted square corresponds to the structure "having a branched hydrophobic group(s)".

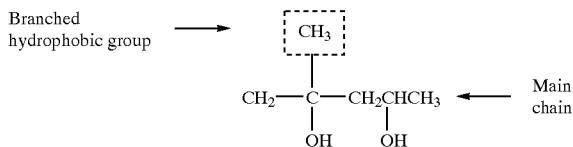

Among the above water-soluble organic solvents, alcohols having a branched hydrophobic group(s) are the compounds represented by the formula $C_nH_{2n+2}O$ (n: an integer of 4 to 6) such as isobutanol, s-butanol, t-butanol ($C_4$), isopentanol, s-pentanol, t-pentanol, 3-pentanol, 3-methyl-2-butanol, 2-methyl-1-butanol ($C_5$), 2-ethylbutanol, 4-methyl-2-pentanol ($C_6$), etc.

Examples of glycols and glycol ethers having a branched hydrophobic group(s) include 1,3-octylene glycol, hexylene glycol, dipropylene glycol, tripropylene glycol, polypropylene glycol, poly(oxyethylene-oxypropylene) derivatives, ethylene glycol monoisopropyl ether,. propylene glycol monobutyl ether, propylene glycol monoethyl ether, dipropylene glycol monobutyl ether, dipropylene glycol monopropyl ether, dipropylene glycol monoethyl ether and dipropylene glycol monomethyl ether.

Among these water-soluble organic solvents, dipropylene glycol monopropyl ether, dipropylene glycol monomethyl ether, hexylene glycol, etc. are preferably used.

The amount of the water-soluble solvent can be suitably selected depending on the type of the water-soluble organic solvent, etc., and is usually about 1–50% by weight, preferably 5–30% by weight, based on the ink of the present invention. When the concentration of the water-soluble organic solvent in the ink exceeds 50% by weight, the solubility of the water-soluble resin decreases, and the water-soluble resin may be precipitated. When the concentration of the water-soluble organic solvent is less than 1% by weight, a sufficient permeability and dispersibility may not be obtained.

Water-soluble Dye

In the present invention, at least one of anthraquinone dyes, carbonium dyes and metal complex dyes is essentially used as the water-soluble dye. Known dyes or commercial dyes can be used as the above dyes. It is prefereble to use at least one of carbonium dyes and metal complex dyes among the above-mentioned dyes in the present invention.

Usable anthraquinone dyes are those having an anthraquinone structure, and include anthraquinone derivatives and anthrone derivatives. For example, C.I. Acid Blue 27, C.I. Acid Blue 43, C.I. Acid Green 25, C.I. Basic Violet 25, C.I. Basic Blue 60, C.I. Mordant Red 11, C.I. Acid Red 83, C.I. Direct Green 28 and C.I. Mordant Blue 48 are usable.

The carbonium dyes are not particularly limited and may be any of those based on a carbonium ion. Diphenyl methane dyes, triphenyl methane dyes, xanthene dyes and acridine dyes are preferable for use in the present invention. Examples of diphenyl methane dyes include C.I. Basic Yellow 2, C.I. Basic Yellow 3 and C.I. Basic Yellow 37. Examples of triphenyl methane dyes include C.I. Acid Blue 90, C.I. Acid Green 16, C.I. Acid Violet 49, C.I. Basic Red 9, C.I. Basic Blue 7, C.I. Acid Violet 1, C.I. Direct Blue 41, C.I. Mordant Blue 1 and C.I. Mordant Violet 1. Examples of xanthene dyes include C.I. Acid Yellow 74, C.I. Acid Red 52, C.I. Acid Violet 30, C.I. Basic Red 1, C.I. Basic Violet 10, C.I. Mordant Red 27 and C.I. Mordant Violet 25. Examples of acridine dyes include C.I. Basic Yellow 6, C.I. Basic Yellow 7, C.I. Basic Orange 14 and C.I. Basic Orange 15.

The metal complex dyes include the dyes containing metals and the dyes which can be bonded with a metal by a coordinate bond, as well as metal complex dyes. The usable dyes which can be bonded with a metal by a coordinate bond, for example, are azo dyes having an OH group, COOH group, $NH_2$ group, etc. Examples of such azo dyes include C.I. Mordant Red 30, C.I. Mordant Yellow 3, C.I. Mordant Green 15 and C.I. Mordant Blue 13.

Among these metal complex dyes, copper phthalocyanine dyes, 1:1 type metal complex dyes, 1:2 type metal complex dyes are suitably used. More specifically, examples of the copper phthalocyanine dyes include C.I. Direct Blue 86. Examples of 1:1 type metal complex dyes include C.I. Acid Yellow 54, C.I. Acid Orange 74, C.I. Acid Red 186 and C.I. Acid Violet 56. Examples of 1:2 type metal complex dyes include C.I. Acid Yellow 59, C.I. Acid Black 60, C.I. Acid Red 296 and C.I. Acid Blue 167.

The amount of the water-soluble dyes may be suitably selected depending on the type of the water-soluble dye used therein. Usually, the concentration is about 0.1–10% by weight, preferably 1–5% by weight, based on the ink of the present invention. When the concentration of the water-soluble dye is higher than 10% by weight, the viscosity and fluidity of the ink may be adversely affected. When the concentration is lower than 0.1% by weight, the desired double-color effect may not be produced.

Water-soluble Resin, etc.

The ink of the present invention may optionally contain water-soluble resins. The type of the water-soluble resins are not restricted insofar as they can impart viscosity and/or adhesion to an aqueous ink, and may be suitably selected depending on the application of the ink, etc. Examples of usable resins include polysaccharides produced by microorganisms and their derivatives such as pullulan, xanthan gum, welan gum and rhamsan gum; water-soluble vegetable polysaccharides and their derivatives such as guar gum, locust bean gum and pectin; water-soluble animal polysaccharides and their derivatives such as gelatin and casein; cellulose derivatives such as hydroxyethyl cellulose, carboxy methyl cellulose (CMC), hydroxypropyl cellulose and like sodium salts and ammonium salts of cellulose; starch derivatives such as starch, cation starch, dextrin, sodium carboxymethyl starch; vinyl synthetic polymers such as polyvinyl alcohol (PVA), polyvinylpyrolidone and polyvinyl ether; acrylic synthetic polymers such as sodium polyacrylate and carboxyvinyl polymers; other synthetic polymers such as polyethylene oxide and a copolymer of methoxyethylene and maleic acid. These resins may be used singly or in combinations of two or more types.

The amount of the water-soluble resin may be suitably selected depending on the type of the water-soluble resins, and is usually about 0.05–40% by weight, preferably 0.1–30% by weight, based on the ink of the present invention. When the concentration of the water-soluble resin is higher than 40% by weight, writing may be difficult. When the concentration of the water-soluble resins is lower than 0.05% by weight, the desired additive effect may not be exerted.

The ink of the present invention may contain other additives in an amount which does not adversely affect the performance of the ink. For example, the ink may contain an alkali metal salt of polyoxyethylene, dicarboxylic acid amide, a phosphoric acid ester, N-oleyl sarcosine salt, etc., as a lubricant; polyvalent alcohols and their derivatives (glycerin, etc.) as a wetting agent; benzotriazole, tolyltriazole, dicyclohexylammonium nitrate, etc., as an antirust agent; benzoisothiazoline, pentachlorophenol, cresol, etc., as an antiseptic and antirust agent; and other dispersing agents and surfactants.

The present invention possibly contains, for example, NaCl, $Na_2SO_4$ and like alkali metal salts. In this case, the combined concentration of the alkali metal salts in the ink composition is preferably not higher than 1% by weight. By controlling the concentration of the alkali metal salts (particularly at least one of NaCl and $Na_2SO_4$), it is possible to prevent the water-soluble organic solvent from separation in the ink due to salting out, leading to better stability over time. The method for controlling the amount of the alkali metal salts is not particularly limited. In case of dyes, for example, part of or all of alkali metal salts are actively removed using methanol, ethanol or the like to control the amount of the alkali metal salts. When the amount of the alkali metal salts in the ink is 0–1% by weight, the ink may be used as it is.

The ink viscosity of the ink of the present invention, particularly for use in an aqueous ballpoint pen, is preferably about 1000–10000 mPa·s determined with an ELD viscometer (30° (R14) cone 0.5 rpm (20° C.)). The ink viscosity within said range can provide the aqueous ballpoint pen with remarkable stability over time and writing properties. The ink viscosity can be adjusted with water-soluble resins, water or the like.

Further, when the ink of the present invention is used for an aqueous ballpoint pen, the ink pH is preferably about 5–10. By setting pH within this range, even better stability over time can be achieved. The pH of the ink may be suitably adjusted with sodium hydroxide, triethanolamine or other known pH regulators. The pH is determined with a pH meter (20° C.).

The ink of the present invention can be prepared by conventional dispersion methods, deaeration methods, filtration methods, etc. For example, water, water-soluble dyes and metal powder pigments are mixed and stirred, and then water-soluble resins are added to the mixture. Subsequently, water-soluble organic solvents and various additives, if necessary, are added to the mixture. The pH of the mixture is adjusted with a known pH regulator such as sodium hydroxide and triethanolamine, giving the ink of the invention. Mixing and stirring in each step may be carried out by using a conventional mixing device such as desolver, mixer and kneader.

2. Writing Utensil

The ink of the invention is useful for various writing utensils such as markers, felt-tip pens, ballpoint pens, etc., and is particularly suitable for aqueous ballpoint pens. Basically, the writing utensils of the present invention may be formed of the components for known writing utensils (markers, aqueous ballpoint pens, etc.) except the ink.

In case of an aqueous ballpoint pen, for example, an ink reservoir pipe made from known materials in conventional sizes may be employed in the present invention. Examples of the materials include synthetic resin pipes made of polyethylene, polypropylene, etc., and metal pipes.

As a ballpoint pen tip, the same materials and constructions of conventional aqueous ballpoint pens may be employed. In the present invention, however, it is preferable to use a ball having a diameter smaller than the inner diameter of a ball housing by at least 0.03 mm, particularly 0.03–0.04 mm. In the present invention, the diameter difference between the ball and the inner ball housing corresponds to the distance between the ball and the inner wall of the ball housing at the point where they are most closely positioned. The difference between the ball diameter and the inner diameter of the ball housing in conventional ballpoint pens (ballpoint pen tip) is usually about 0.01–0.02, whereas a greater difference of at least 0.03 mm is employed in the present invention. Therefore, the ink of the invention has better writing properties, producing double-color development more effectively.

The ball diameter in the above ballpoint pen tip is not particularly limited insofar as the aforementioned difference in diameter is provided, and may be suitably selected within the range of the conventional ball diameter. The configuration and size (inner diameter) of an ink conduit for providing the ball tip with the ink are not particularly limited, and may be the same as those of conventional ballpoint pens.

The materials of the above ballpoint pen tip (ball and ball housing) are not particularly limited, and may be those conventionally known, e.g., hard metals (nickel white, stainless steel, etc.). In the present invention, it is particularly preferable to use ceramics as the ball material. The ceramics are not limited, and it is preferable that at least one of silicon carbide, silicon nitride, zirconia and alumina is used.

Figure 2:
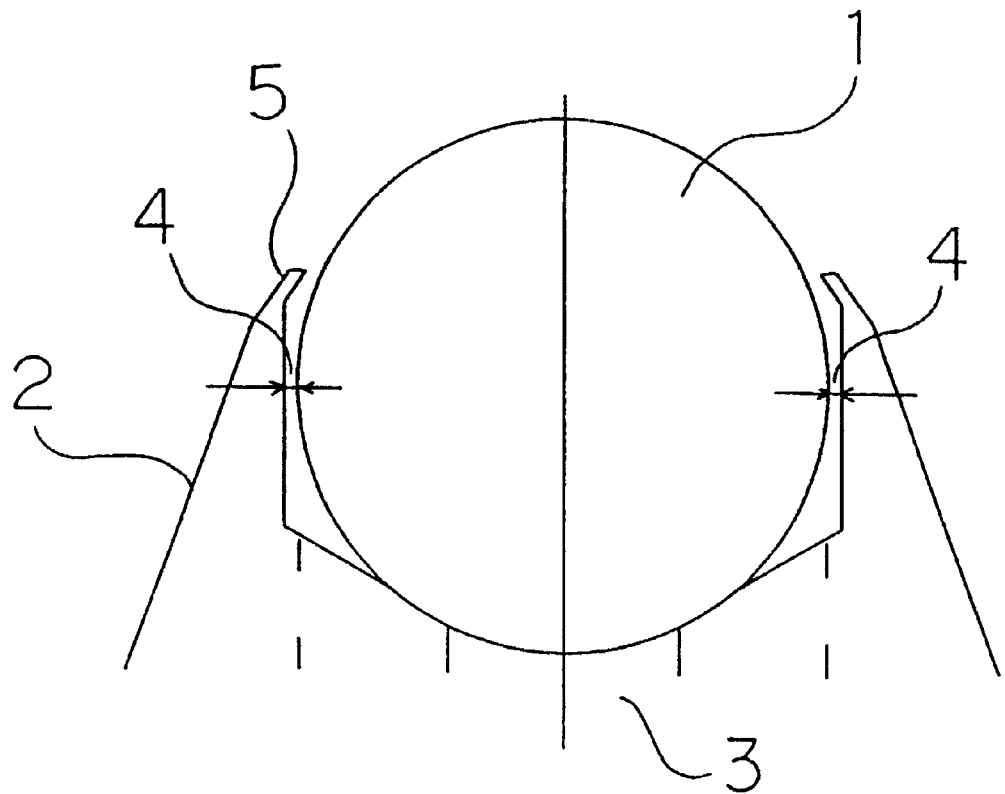
FIG. 2 is a schematic drawing of a ballpoint pen tip.

FIG. 2 (sectional view) shows an example of the above ballpoint pen tip, wherein a ball (1), a ball housing (2) and an ink conduit (3) constitute the ballpoint pen tip, and the difference between the ball diameter and the inner diameter of the ball housing (namely, the sum of (4) and (4)) is set not shorter than 0.03 mm (preferably 0.03–0.04 mm). The difference, as mainly depending on the ball diameter, the inner diameter of the ball housing and the shape of the ball housing, can be suitably controlled by adjusting any of them.

The tip end (5) of the ball housing is caulked to prevent the ball from falling off.

The above structure can be produced by known techniques for producing ballpoint pen tips. For example, the ballpoint pen tip can be produced by the method comprising the steps of placing the ball within the ball housing; caulking the tip end of the ball housing; pushing up the ball with a rod from the rear end of the ball housing toward the sharp end thereof to finish the caulked portion.

The assembly of the above aqueous ballpoint pen may be carried out according to conventional ballpoint pen assembly methods. For example, after a core is produced by placing ink into a transparent or translucent polypropylene ink reservoir pipe (refill) having one end equipped with the ballpoint pen tip of the present invention, the core is attached to a main body, which is then provided with a cap and an end stopper. In the present invention, centrifuging may be optionally conducted to remove air mixed therein when placing ink and the like to the pipe.

3. Color Development Method

The present invention also covers the method characterized by removing metal powder pigments by rubbing with an eraser at least part of the writing which is written with the ink of the invention on an absorbent surface.

Basically, the writing written with the ink of the invention on an absorbent surface exhibits the double-color effect having the structure shown in FIG. 1.

In the present invention, the size of the colored surface (dyed surface) made by "colorants +water-soluble organic solvents" in FIG. 1(B) can be limitlessly as large as that of the colored surface (metallic surface) made by "metal powder pigments". In other words, the dyed surface can be controlled to conform almost exactly to the metallic surface. In this case, the writing appears almost in a single color to the unaided eye, and the present invention includes this state as an embodiment thereof. The size of the dyed surface can be adjusted by suitably selecting the type of water-soluble organic solvents, absorbent surfaces, etc.

When the writing written with the ink of the present invention is rubbed with an eraser, it is deprived of only its metallic surface, leaving only the dyed surface on the absorbent surface. This enables the dyed surface, which has been covered by the metallic surface, to be exposed, allowing the color development of the dye only. For example, when only part of the writing is rubbed with an eraser, various appearances can be produced by combining the double-color development and the single dye color development, and numerous designs are possible.

The eraser used in the above is not particularly limited, and may be any commercially available ones. The type (material) of the absorbent surface is not limited either, and any type of absorbent surfaces can be used insofar as the effect of the present invention can be achieved. For example, papers, fibers, wooden materials, fabrics, etc., can be used.

According to the double-color ink of the present invention and the writing utensil using the same, since specific water-soluble organic solvents and water-soluble dyes are applied to the metal powder pigments, the initial color development thereof can be maintained for a long period. Thus, it is possible to obtain the double-color effect which remains stable for a long period.

Further, with the ink of the present invention, even though the aqueous ink therein is thickened, the colorant in the ink sufficiently permeates the writing surface and is dispersed therein. Therefore, the ink can form an effective contour and exhibit excellent double-color performance.

Further in the present invention, when the concentration of the alkali metal salts in the ink is controlled, the separation of solvent components in the ink can be more securely prevented so that the ink retains the excellent double-color effect.

The writing written with the ink of the invention is substantially deprived only of its metal powder pigments when rubbed with an eraser. Thus, it is readily possible to obtain the color development of only dyes from the writing and to create various designs.

The double-color ink of the present invention is useful for various writing utensils, particularly for aqueous ballpoint pens. In addition, the aqueous ballpoint pen of the invention, when employing a ballpoint pen tip of a particular structure, can discharge an optimum amount of the ink so that the double-color effect of the ink of the invention can be exerted more prominently.

BEST MODE FOR CARRYING OUT THE INVENTION

Examples and Comparative Examples are shown below to illustrate the features of the present invention in further details.

EXAMPLES 1–9 AND COMPARATIVE EXAMPLES 1–2

The inks having the compositions shown in Table 1 were prepared. Firstly, a predetermined amount of water, water-soluble dyes and metal powder pigments were mixed and stirred. To the mixtures were added water-soluble resins, followed by stirring at an ambient temperature for one hour. Subsequently, water-soluble organic solvents, wetting agents, antiseptics and lubricants were added to the mixtures. The mixtures were stirred at an ambient temperature for one hour, while regulating pH with a pH regulator (triethanolamine, sodium hydroxide, etc.), giving ink compositions. The resulting inks were measured for their viscosities, pH and concentrations (% by weight) of alkali metal salt contents. The results are shown in Table 1.

The components shown in Table 1 are as follows:
(1) Water-soluble Dye
  Water-soluble dye 1: Xanthene dye ("CHUGAI INK RED AM-5" manufactured by Chugai Kasei Co., Ltd., C.I. Acid Red 87, salt content: not higher than about 2% by weight)
  Water-soluble dye 2: Triphenyl methane dye ("ACID BLUE P1 conc." manufactured by Sumitomo Chemical Co., Ltd., C.I Acid Violet 21, salt content: at least about 5% by weight)
  Water-soluble dye 3: 1:1 metal complex dye ("LANYLNAVY BLUE TW" manufactured by Sumitomo Chemical Co., Ltd., C.I. Acid Blue 193, salt content: not higher than about 10% by weight)
  Water-soluble dye 4: 1:2 metal complex dye ("LANYL RED B" manufactured by Sumitomo Co., Ltd., C.I. Acid Red 215, salt content: not higher than about 10% by weight)
  Water-soluble dye 5: Azo dye which can be bonded with a metal by a coordinate bond ("SUNCHROMINE FAST BLUE MB" manufactured by Sumitomo Chemical Co., Ltd., C.I. Mordant Blue 13, salt content: not higher than about 10% by weight)
  Water-soluble dye 6: Anthraquinone dye ("SUMINOL FAST PR conc." manufactured by Sumitomo Chemical Co., Ltd., C.I. Acid Blue 129, salt content: not higher than about 10% by weight)

Water-soluble dye 7: Copper phthalocyanine dye ("SUMILIGHT SUPRATURQUOISE BLUE" manufactured by Sumitomo Chemical Co., Ltd., C.I. Direct Blue 86, salt content: not higher than 10% by weight)

Water-soluble dye 8: Diphenyl methane dye ("AURAMINE EXTRA 0–125;0–100" manufactured by Sumitomo Chemical Co. Ltd., C.I. Basic Yellow 2, salt content: not higher than 10% by weight)

Water-soluble dye 9: Acridine dye ("SUMITOMO ACRIDINE ORANGE NO;RK conc." manufactured by Sumitomo Chemical Co., Ltd., C.I. Basic Orange 14, salt content: not higher than 10% by weight)

Water-soluble dye 10: Disazo dye ("SUMINOL MILLING SCARLET G" manufactured by Sumitomo Chemical Co., Ltd., C.I. Acid Red 145, salt content: not higher than about 10% by weight)

Water-soluble dye 11: Monoazo dye ("SUMINOL FAST RED GG CONC" manufactured by Sumitomo Chemical Co., Ltd., C.I. Acid Red 19, salt content: not higher than about 10% by weight)

The salt content indicates the concentration of alkali metal salts in each water-soluble dye. Except the water-soluble dyes 1 and 2, the salt contents in the dyes were removed with solvents such as methanol and ethanol before use.

(2) Water-soluble Organic Solvent

Water-soluble organic solvent 1: Dipropylene glycol monopropyl ether (reagent)

Water-soluble organic solvent 2: Dipropylene glycol monomethyl ether (reagent)

Water-soluble organic solvent 3: Hexylene glycol (reagent)

(3) Water-soluble Resin

Water-soluble resin 1: Rhamsan gum ("K7C233" manufactured by Sansho Co., Ltd.)

Water-soluble resin 2: Welan gum ("K1A96" manufactured by Sansho Co. Ltd.)

Water-soluble resin 3: CMC ("Selogen 5A" manufactured by Daiichi Kogyo Seiyaku)

Water-soluble resin 4: PVA ("PVA-204" manufactured by Kuraray Co., Ltd.)

(4) Metal Powder Pigment

Metal powder pigment 1: Aluminum powder pigment ("Alpaste WXM0630" manufactured by Toyo Aluminum Co., Ltd. (leafing type, average particle diameter: 8 μm, aluminum powder content: about 55–56% by weight))

Metal powder pigment 2: Colored aluminum powder pigment ("F701RE-W" manufactured by Showa Aluminum Corporation (non-leafing type, average particle diameter: 11 μm, aluminum powder content: about 60–70% by weight)

(5) Additives

Wetting agent: Glycerin (reagent)

Antiseptic fungicide: 1,2-benzoisothiazoline-3-on ("Proxel GXL" manufactured by Hoechst Gosei K.K.)

Lubricant: Maleic monoamide (reagent)

TEST EXAMPLE 1

Cores were prepared by placing the inks having the compositions (% by weight) shown in Table 1 into polypropylene ink reservoir pipes having one end equipped with a nickel-white ballpoint pen tip (ball material: ceramics). Subsequently, the cores were attached to main bodies, which were then provided with end stoppers. Finally, air within the pipes of the core was removed with a centrifuge, giving ballpoint pens.

The ballpoint pens were evaluated for their storability, which was determined by visually examining the level of discoloration of the writing written with the inks after being stored at 50° C. for one month (written on commercially available loose-leaf pads). ○ indicates that no change was observed in hue after storage; X indicates that a change was observed in hue after storage. The results are shown in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|---|
| Water-soluble dye | 1 | 3.00 |  |  |  |  |  |  |  |  |  |  |
|  | 2 |  | 3.00 |  |  |  |  |  |  |  |  |  |
|  | 3 |  |  | 3.00 |  |  |  |  |  |  |  |  |
|  | 4 |  |  |  | 3.00 |  |  |  |  |  |  |  |
|  | 5 |  |  |  |  | 3.00 |  |  |  |  |  |  |
|  | 6 |  |  |  |  |  | 3.00 |  |  |  |  |  |
|  | 7 |  |  |  |  |  |  | 3.00 |  |  |  |  |
|  | 8 |  |  |  |  |  |  |  | 3.00 |  |  |  |
|  | 9 |  |  |  |  |  |  |  |  | 3.00 |  |  |
|  | 10 |  |  |  |  |  |  |  |  |  | 3.00 |  |
|  | 11 |  |  |  |  |  |  |  |  |  |  | 3.00 |
| Water-soluble organic solvent | 1 | 7.00 | 7.00 | 7.00 | 7.00 | 7.00 | 7.00 | 7.00 |  |  | 7.00 | 7.00 |
|  | 2 | 15.00 | 15.00 |  |  | 7.50 | 7.50 | 7.50 | 30.00 |  | 15.00 | 15.00 |
|  | 3 |  |  | 15.00 | 15.00 | 7.50 | 7.50 | 7.50 |  | 30.00 |  |  |
| Water-soluble resin | 1 | 0.20 | 0.20 |  |  | 0.20 | 0.20 | 0.20 | 0.20 | 0.20 | 0.20 | 0.20 |
|  | 2 |  |  | 0.20 | 0.20 |  |  |  |  |  |  |  |
|  | 3 | 0.50 |  | 0.50 |  | 0.50 | 0.50 | 0.50 | 0.50 | 0.50 |  | 0.50 |
|  | 4 |  | 0.50 |  | 0.50 |  |  |  |  |  | 0.50 |  |
| Metal powder pigment | 1 | 10.00 |  |  | 10.00 | 10.00 | 10.00 | 10.00 | 10.00 | 10.00 | 10.00 | 10.00 |
|  | 2 |  | 10.00 | 10.00 |  |  |  |  |  |  |  |  |
| Wetting agent | 1 | 2.00 | 2.00 | 2.00 | 2.00 | 2.00 | 2.00 | 2.00 | 2.00 | 2.00 | 2.00 | 2.00 |
| Antiseptic fungicide | 1 | 0.10 | 0.10 | 0.10 | 0.10 | 0.10 | 0.10 | 0.10 | 0.10 | 0.10 | 0.10 | 0.10 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|---|
| Lubricant | 1 | 1.20 | 1.20 | 1.20 | 1.20 | 1.20 | 1.20 | 1.20 | 1.20 | 1.20 | 1.20 | 1.20 |
| Water |  | 61.00 | 61.00 | 61.00 | 61.00 | 61.00 | 61.00 | 61.00 | 53.00 | 53.00 | 61.00 | 61.00 |
| Total |  | 100.00 | 100.00 | 100.00 | 100.00 | 100.00 | 100.00 | 100.00 | 100.00 | 100.00 | 100.00 | 100.00 |
| Storability |  | ○ | ○ | ○ | ○ | ○ | ○ | ○ | ○ | ○ | x | x |
| Before storage | Ink viscosity | 3200 | 3100 | 3800 | 4100 | 3300 | 3300 | 3400 | 3300 | 3100 | 3200 | 3400 |
|  | Ink pH | 8.5 | 8.4 | 8.5 | 8.2 | 8.4 | 8.4 | 8.6 | 8.5 | 8.3 | 8.5 | 8.3 |
|  | Salt concentration (%) | 0.06 | 0.15 | 0.3 | 0.3 | 0.3 | 0.3 | 0.3 | 0.3 | 0.3 | 0.3 | 0.3 |

After storage, the inks of Comparative Examples 1 and 2 became blackish and unable to produce the double-color effect.

In Examples 1–9, on the other hand, the outlines formed by the water-soluble dyes appeared around the writings formed by the metal powder pigments, and the writing with pronounced double-color development was obtained. The color development of the inks after storage remained the same as before storage. In addition, when the writings made with the inks were rubbed with a commercially available eraser, the metal powder pigments on the rubbed parts of the writings were removed and the writing made by the water-soluble dyes appeared clearly.

As apparently seen from these results, the ink of the present invention remains stable after long-term storage. Therefore, the ink can produce the desired double-color effect.

EXAMPLES 10–18 AND COMPARATIVE EXAMPLES 3–4

The inks having the compositions shown in Table 2 were prepared in the similar manner as in Example 1. the components shown in Table 2 are the same as those of Table 1.

TEST EXAMPLE 2

The ink compositions having the compositions (% by weight) shown in Table 2 were placed in the containers of "Sakura Fuchidori Marker Metallic (PMK meta-H, manufactured by Sakura Color Products Corporation), giving marker pens.

The marker pens were tested for their storability in the same manner as in Test Example 1. The results are shown in Table 2.

TABLE 2

|  |  | Ex. 10 | Ex. 11 | Ex. 12 | Ex. 13 | Ex. 14 | Ex. 15 | Ex. 16 | Ex. 17 | Ex. 18 | Comp. Ex. 3 | Comp. Ex. 4 |
|---|---|---|---|---|---|---|---|---|---|---|---|---|
| Water-soluble dye | 1 | 3.00 |  |  |  |  |  |  |  |  |  |  |
|  | 2 |  | 3.00 |  |  |  |  |  |  |  |  |  |
|  | 3 |  |  | 3.00 |  |  |  |  |  |  |  |  |
|  | 4 |  |  |  | 3.00 |  |  |  |  |  |  |  |
|  | 5 |  |  |  |  | 3.00 |  |  |  |  |  |  |
|  | 6 |  |  |  |  |  | 3.00 |  |  |  |  |  |
|  | 7 |  |  |  |  |  |  | 3.00 |  |  |  |  |
|  | 8 |  |  |  |  |  |  |  | 3.00 |  |  |  |
|  | 9 |  |  |  |  |  |  |  |  | 3.00 |  |  |
|  | 10 |  |  |  |  |  |  |  |  |  | 3.00 |  |
|  | 11 |  |  |  |  |  |  |  |  |  |  | 3.00 |
| Water-soluble organic solvent | 1 | 10.00 | 10.00 | 10.00 | 10.00 | 10.00 | 10.00 | 10.00 |  |  | 10.00 | 10.00 |
|  | 2 | 20.00 | 20.00 |  |  | 10.00 | 10.00 | 10.00 | 40.00 |  | 20.00 | 20.00 |
|  | 3 |  |  | 20.00 | 20.00 | 10.00 | 10.00 | 10.00 |  | 40.00 |  |  |
| Water-soluble resin | 1 |  |  |  |  |  |  |  |  |  |  |  |
|  | 2 |  |  |  |  |  |  |  |  |  |  |  |
|  | 3 |  |  |  |  |  |  |  | 0.5 |  |  |  |
|  | 4 |  |  |  |  |  |  |  |  | 0.5 |  |  |
| Metal powder pigment | 1 | 10.00 |  |  | 10.00 | 10.00 | 10.00 | 10.00 | 10.00 | 10.00 | 10.00 | 10.00 |
|  | 2 |  | 10.00 | 10.00 |  |  |  |  |  |  |  |  |
| Wetting agent | 1 | 2.00 | 2.00 | 2.00 | 2.00 | 2.00 | 2.00 | 2.00 | 2.00 | 2.00 | 2.00 | 2.00 |
| Antiseptic fungicide | 1 | 0.10 | 0.10 | 0.10 | 0.10 | 0.10 | 0.10 | 0.10 | 0.10 | 0.10 | 0.10 | 0.10 |
| Lubricant | 1 | 1.20 | 1.20 | 1.20 | 1.20 | 1.20 | 1.20 | 1.20 | 1.20 | 1.20 | 1.20 | 1.20 |
| Water |  | 61.00 | 61.00 | 61.00 | 61.00 | 61.00 | 61.00 | 61.00 | 53.00 | 53.00 | 61.00 | 61.00 |
| Total |  | 107.30 | 107.30 | 107.30 | 107.30 | 107.30 | 107.30 | 107.30 | 109.80 | 109.80 | 107.30 | 107.30 |
| Storability |  | ○ | ○ | ○ | ○ | ○ | ○ | ○ | ○ | ○ | x | x |

In Comparative Examples 3 and 4, the inks became blackish, underwent hue changes and could not produce the desired double-color effect after storage.

In Examples 10–18, on the other hand, the outlines formed by the water-soluble dyes appeared around the writings formed by the metal powder pigments, and the writing with pronounced double-color development was obtained. The color development of the inks after storage remained the same as before storage. In addition, when the writings made with the inks were rubbed with a commercially available eraser, the metal powder pigments on the rubbed parts of the writings were removed and the writings made by the water-soluble dyes appeared clearly.

Examples 19–26

The ink compositions having the compositions (% by weight) shown in Table 3 were prepared. Firstly, a predetermined amount of water, colorants and metal powder pigments were mixed and stirred. To the mixtures were added water-soluble resins, followed by stirring at an ambient temperature for one hour. Subsequently, water-soluble organic solvents, a wetting agent, an antiseptic and a lubricant were added to the mixtures which was then stirred at an ambient temperature for one hour while regulating pH of the mixtures with a pH regulator, giving the ink compositions.

The components shown in Table 3 are as follows:

(1) Water-soluble Organic Solvent

Water-soluble organic solvent 1: Dipropylene glycol monopropyl ether (reagent)

Water-soluble organic solvent 2: Dipropylene glycol monobutyl ether (reagent)

Water-soluble organic solvent 3: Dipropylene glycol monoethyl ether (reagent)

Water-soluble organic solvent 4: Dipropylene glycol monomethyl ether (reagent)

Water-soluble organic solvent 5: Tripropylene glycol (reagent)

Water-soluble organic solvent 6: Tripropylene glycol monomethyl ether (reagent)

Water-soluble organic solvent 7: Hexylene glycol (reagent)

Water-soluble organic solvent 8: t-Butanol (reagent)

(2) Colorant (water-soluble dye)

Water-soluble dye 1: Triphenyl methane dye ("NAPHTHALENE GREEN VSC" manufactured by Sumitomo Chemical Co., Ltd., C.I. Acid Green 16, salt content: not higher than about 10% by weight)

Water-soluble dye 2: Disazo dye ("SUMINOL MILLING SCARLET G." manufactured by Sumitomo Chemical Co., Ltd., C.I. Acid Red 145, salt content: not higher than about The salt contents (NaCl) in the dyes are the total amount (% by weight), and were removed using methanol, ethanol and the like.

(3) Water-soluble Resin

Water-soluble resin 1: Rhamsan gum ("K7C233" manufactured by Sansho Co., Ltd.)

Water-soluble resin 2: Welan gum ("K1A96" manufactured by Sansho Co., Ltd.)

Water-soluble resin 3: Carboxymethyl cellulose ("Selogen 5A" manufactured by Daiichi Kogyo Seiyaku K.K.)

Water-soluble resin 4: Polyvinyl alcohol ("PVA-204" manufactured by Kuraray Co., Ltd.)

(4) Metal Powder Pigment

Metal powder pigment 1: Aluminum powder pigment ("WXM0630" manufactured by Toyo Aluminum Co., Ltd. (leafing type, average particle diameter: about 8$\mu$m, aluminum powder content: about 55–56% by weight)

Metal powder pigment 2: Colored aluminum powder pigment ("F701RE-W" manufactured by Showa Aluminum Corporation (non-leafing type, average particle diameter: about 11 $\mu$m, aluminum powder content: about 60–70% by weight)

(5) Additives

Wetting agent: Glycerin (reagent)

Antiseptic fungicide: 1,2-benzoisothiazoline-3-on ("Proxel GXL" manufactured by Hoechst Gosei K.K.)

Lubricant: Maleic monoamide (reagent)

Test Example 2

Cores were prepared by placing the ink compositions shown in Table 3 into polypropylene ink reservoir pipes having one end equipped with a ballpoint pen tip (ball material: SiC ceramics, distance between the ball and housing: 0.035 mm) made of stainless steel. Subsequently, the cores were attached to main bodies, which were then provided with end stoppers. Finally, air in the cores was separated by a centrifuge, giving ballpoint pens.

The ballpoint pens were tested for their double-color property, writing property, storability, ink viscosity and ink pH after being stored at 50° C. for one month. The results are shown in Table 3 which also shows the properties of the inks before storage. The tests were carried out in the following manners:

(1) Double-color Property

The writings made by the ballpoint pens on commercially available loose-leaf pads were visually inspected for double-color properties. ○ indicates that the double-color property was found; X indicates that the double-color property was not clearly found or was not found at all.

(2) Writing Property

The writings made by the ballpoint pens on commercially available loose-leaf pads were visually inspected for their states. ○ indicates that no scratches, discontinuation in the lines, clogging at the writing tip or the like were found; X indicates that any of the above was found.

(3) Storability

The writings made with the inks which have been stored at 50° C. for one month were visually inspected for their level of discoloration. ○ indicates that no change in hue was found after storage; X indicates that a change in hue was found.

(4) Ink Viscosity

The results (mPA·s) of the measurements of the inks viscosity determined with an ELD viscometer (30°, R14, cone, 0.5 rpm, 20° C.) are shown.

(5) Ink pH

The results of the measurement of the ink pH determined with a pH meter (20° C.) are shown.

TABLE 3

|  |  | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Water-soluble dye | 1 | 7.00 | 7.00 | 7.00 | | | | | |
|  | 2 | | | | 4.00 | | | | |
|  | 3 | | | | 8.00 | | | | |
|  | 4 | 14.00 | | | | | | | 30.00 |
|  | 5 | | | 7.00 | | | | | |
|  | 6 | | | 7.00 | 7.00 | | | | |
|  | 7 | | 14.00 | | | 30.00 | | 10.00 | |
|  | 8 | | | | | | 30.00 | 20.00 | |
| Water-soluble organic solvent | 1 | 3.00 | 3.00 | 3.00 | 3.00 | | | 3.00 | 3.00 |
|  | 2 | | | | | 3.00 | 3.00 | | |
| Water-soluble resin | 1 | 0.20 | 0.20 | | | 0.20 | 0.20 | 0.20 | 0.20 |
|  | 2 | | | 0.20 | 0.20 | | | | |
|  | 3 | 0.50 | | 0.50 | | 0.50 | 0.50 | 0.50 | 0.50 |
|  | 4 | | 0.50 | | 0.50 | | | | |
| Metal powder pigment | 1 | 10.00 | 10.00 | | | 10.00 | 10.00 | 10.00 | 10.00 |
|  | 2 | | | 10.00 | 10.00 | | | | |
| Wetting agent | 1 | 2.00 | 2.00 | 2.00 | 2.00 | 2.00 | 2.00 | 2.00 | 2.00 |
| Antiseptic fungicide | 1 | 0.10 | 0.10 | 0.10 | 0.10 | 0.10 | 0.10 | 0.10 | 0.10 |
| Lubricant | 1 | 1.20 | 1.20 | 1.20 | 1.20 | 1.20 | 1.20 | 1.20 | 1.20 |
| Water |  | 62.00 | 62.00 | 62.00 | 64.00 | 53.00 | 53.00 | 53.00 | 53.00 |
| Total |  | 100.00 | 100.00 | 100.00 | 100.00 | 100.00 | 100.00 | 100.00 | 100.00 |
| Before storage | Double-color property | ○ | ○ | ○ | ○ | ○ | ○ | ○ | ○ |
|  | Writing property | ○ | ○ | ○ | ○ | ○ | ○ | ○ | ○ |
|  | Ink viscosity | 3100 | 3300 | 3800 | 4200 | 3300 | 3300 | 3500 | 3300 |
|  | Ink pH | 8.5 | 8.4 | 8.5 | 8.2 | 8.4 | 8.4 | 8.6 | 8.5 |
|  | Salt concentration (%) | 0.3 | 0.3 | 0.3 | 0.3 | 0.3 | 0.3 | 0.3 | 0.3 |
| After storage (50° C., one month) | Double-color property | ○ | ○ | ○ | ○ | ○ | ○ | ○ | ○ |
|  | Writing property | ○ | ○ | ○ | ○ | ○ | ○ | ○ | ○ |
|  | Storability | ○ | ○ | ○ | ○ | ○ | ○ | ○ | ○ |

As apparently seen from the results in Table 3, in Examples 19, 20, 25 and 26, pronounced double-color writings were obtained with green outlines formed around the writings in silver. In Examples 21 and 22, pronounced double-color writing were obtained with green outlines formed around the writings in metallic red. In Examples 23 and 24, pronounced double-color writing were obtained with red outlines formed around the writings in silver. In all of the above Examples, no change in their functions or hue was observed after storage.

Thus, it can be seen that writing properties are enhanced by using the ink of the present invention and the ballpoint pen tip of the present invention having a specific opening simultaneously, resulting in superior double-color development.

What is claimed is:

1. A double-color ink containing
   (1) a metal powder pigment,
   (2) water,
   (3) at least one water-soluble organic solvent selected from the group consisting of alcohols, glycols and glycolethers having a branched hydrophobic group(s),
   (4) at least one water-soluble dye selected from the group consisting of anthraquinone dyes, carbonium dyes and metal complex dyes and
   (5) at least one water-soluble resin selected from the group consisting of polysaccharides produced by microorganisms and their derivatives.

2. The double-color ink according to claim 1 which further comprises a water-soluble resin.

3. The double-color ink according to claim 1, wherein the water-soluble dye is at least one of carbonium dyes and metal complex dyes.

4. The double-color ink according to claim 1, wherein the water-soluble dye is at least one member selected from the group consisting of diphenyl methane dyes, triphenyl methane dyes, xanthene dyes, acridine dyes, 1:1 metal complex dyes, 1:2 metal complex dyes and copper phthalocyanine dyes.

5. The double-color ink according to claim 1, wherein all of or part of the metal powder pigments are subjected to a waterproof treatment.

6. The double-color ink according to claim 1, wherein the water-soluble organic solvent is an alcohol represented by the formula $C_nH_{2n+2}O$, wherein n is an integer of 4 to 6.

7. The double-color ink according to claim 1, wherein the water-soluble organic solvent is at least one member selected from the group consisting of dipropylene glycol monopropyl ether, dipropylene glycol monomethyl ether and hexylene glycol.

8. The double-color ink according to claim 1, which contains 4–15% by weight of the metal powder pigment.

9. The double-color ink according to claim 1 which contains not higher than 1% by weight of alkali metal salts in total.

10. The double-color ink according to claim 9, wherein the alkali metal salt is at least one of NaCl and $Na_2SO_4$.

11. The double-color ink according to claim 1, wherein ink viscosity is 1000–10000 mPa·s, when measured with an ELD viscometer, 3% R14 cone 0.5 rpm at 20° C.

12. The double-color ink according to claim 1, wherein ink pH is 5–10.

13. A writing utensil using the ink of claim 1.

14. An aqueous ballpoint pen including the ink of claim 1.

15. The aqueous ballpoint pen according to claim 14 including a tip in which the difference between a ball diameter and the inner diameter of a ball housing in said tip is at least 0.03 mm.

16. The aqueous ballpoint pen according to claim 14 including a tip in which the difference between a ball diameter and the inner diameter of a ball housing in said tip is 0.03–0.04 mm.

17. The aqueous ballpoint pen according to claim 14, wherein said pen includes a tip and a ball disposed in said tip, the material of the ball in said tip is ceramics.

18. The aqueous ballpoint pen according to claim 14, wherein said pen includes a tip and a ball disposed in said tip, the material of the ball in the ballpoint pen tip is at least one member selected from the group consisting of silicon carbide, silicon nitride, zirconia and alumina.

19. A method of color development characterized by rubbing with a eraser at least part of the writing made with a double-color ink containing
   (1) a metal powder pigment,
   (2) water,
   (3) at least one water-soluble organic solvent selected from the group consisting of alcohols, glycols and glycol ethers having a branched hydrophobic group(s)
   (4) at least one water-soluble dye selected from the group consisting of anthraquinone dyes, carbonium dyes and metal complex dyes, and
   (5) at least one water-soluble resin selected from the group consisting of polysaccharides produced by microorganisms and their derivatives on an absorbent surface to remove metal powder pigments therefrom.

20. A method according to claim 19, wherein the water-soluble dye is at least one of carbonium dyes and metal complex dyes.

21. A method according to claim 19, wherein the water-soluble dye is at least one member selected from the group consisting of diphenyl methane dyes, triphenyl methane dyes, xanthene dyes, acridine dyes, 1:1 metal complex dyes, 1:2 metal complex dyes and copper phthalocyanine dyes.

22. A method according to claim 19, wherein all of or part of the metal powder pigments are subjected to a waterproof treatment.

23. A method according to claim 19, wherein the water-soluble organic solvent is an alcohol represented by the formula $C_nH_{2n+2}O$, wherein n is an integer of 4 to 6.

24. A method according to claim 19, wherein the water-soluble organic solvent is at least one member selected from the group consisting of dipropylene glycol monopropyl ether, dipropylene glycol monomethyl ether and hexylene glycol.

25. A method according to claim 19, which contains 4–1 5 by weight of the metal powder pigment.

26. A method according to claim 19 which contains not higher than 1% by weight of alkali metal salts in total.

27. A method according to claim 27, wherein the alkali metal salt is at least one of NaCl and $Na_2SO_4$.

28. A method according to claim 19, wherein ink viscosity is 1000–10000 mPa·s, when measured with an ELD viscometer, 3° R14 cone 0.5 rpm at 20° C.

29. A method according to claim 19, wherein ink pH is 5–10.

30. A writing on an absorbent surface formed with a double-color ink containing
   (1) a metal powder pigment,
   (2) water,
   (3) at least one water-soluble organic solvent selected from the group consisting of alcohols, glycols and glycol ethers having a branched hydrophobic group(s),
   (4) at least one water-soluble dye selected from the group consisting of anthraquinone dyes, carbonium dyes and metal complex dyes, and
   (5) at least one water-soluble resin selected from the group consisting of polysaccharides produced by microorganisms and their derivatives and having an upper portion made by said metal powder pigment and a lower portion made by said water-soluble dye, said upper portion overlying said lower portion.

31. A writing on an absorbent surface formed with a double-color ink containing
   (1) a metal powder pigment,
   (2) water,
   (3) at least one water-soluble organic solvent selected from the group consisting of alcohols, glycols and glycol ethers having a branched hydrophobic group(s),
   (4) at least one water-soluble dye selected from the group consisting of anthraquinone dyes, carbonium dyes and metal complex dyes, and
   (5) at least one water-soluble resin selected from the group consisting of polysaccharides produced by microorganisms and their derivatives and having an upper portion made by said metal powder pigment and a lower portion made by said water-soluble dye,
   said upper portion overlying said lower portion and at least a part of said upper portion being removed to expose said lower portion.

* * * * *